US00RE35819E

United States Patent [19]

Suzuki

[11] E Patent Number: Re. 35,819

[45] Reissued Date of Patent: Jun. 2, 1998

[54] SIMULATED VISUAL DISPLAY SYSTEM FOR A GAME DEVICE

[75] Inventor: Hisashi Suzuki, Yokohama, Japan

[73] Assignee: Sega Enterprises, Ltd., Tokyo, Japan

[21] Appl. No.: 610,265

[22] Filed: Mar. 4, 1996

Related U.S. Patent Documents

Reissue of:

[64] Patent No.: 5,320,351
Issued: Jun. 14, 1994
Appl. No.: 891,982
Filed: May 28, 1992

[30] Foreign Application Priority Data

May 30, 1991 [JP] Japan ..... 3-153807

[51] Int. Cl.[6] ..... A63F 9/14

[52] U.S. Cl. ..... 463/6; 463/1; 463/33; 463/46

[58] Field of Search ..... 463/6, 1, 33, 46, 463/62, 32

[56] References Cited

U.S. PATENT DOCUMENTS

| | | | |
|---|---|---|---|
| 2,180,448 | 11/1939 | Williams | 463/60 |
| 3,940,138 | 2/1976 | Ochi | 463/61 |
| 4,090,713 | 5/1978 | Decasare | 463/62 |
| 4,322,080 | 3/1982 | Pennington | 463/52 |

FOREIGN PATENT DOCUMENTS

| | | |
|---|---|---|
| 1259404 | 10/1989 | Japan . |
| 477895 | 8/1967 | Switzerland . |
| 2221846A | 5/1988 | United Kingdom . |
| 2219746A | 4/1989 | United Kingdom . |
| 2237514A | 10/1989 | United Kingdom . |
| WO8602753 | 5/1986 | WIPO . |

*Primary Examiner*—William H. Grieb
*Attorney, Agent, or Firm*—Price, Gess & Ubell

[57] ABSTRACT

An arcade game which can have simulated objects, such as race horses traversing a stimulated race track, can further have video images generated which will represent the same positional relationship of the objects. The track can positionally sense the actual position of the moving objects and an image forming circuit can be responsive to the positional data to generate computer images from a variety of angles based on background images of the track and of the individual horses to project a realistic computer image for observers.

31 Claims, 6 Drawing Sheets

SIMULATED VISUAL DISPLAY SYSTEM FOR A GAME DEVICE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a visual display system for displaying moving objects on a monitor in real time, which will be coordinated with a game device that moves individual simulated objects that are competing on a fixed playing area so that the monitor appears to be imaging the actual competition.

2. Description of Related Art

Various arcade games have existed wherein simulated models of objects, such as race horses, will traverse a track during a race. Observers can participate in the race at individual stations by selecting a specific horse and in some case by participating in a game activity that can be directly related to the advancement of the simulated horse across the track. Generally, the degree of freedom of movement of the horse models is somewhat limited and the ability to simulate the real live action in real time through an accompanying display is not available. Accordingly, the field of arcade games is still seeking to improve a visual simulation of a real life event, for example, a horse race.

SUMMARY OF THE INVENTION

The present invention provides an arcade game wherein simulated models of participants in the event can traverse a track or playing field. The individual models can be autonomously driven and can move, both laterally and longitudinally, across the field. A positional sensing system can monitor the position of each of the individual models, for example, in a sequential manner, and the individual models can receive control signals via a wireless link. An image formation system can form and display on a monitor computer images of the running objects from a variety of angles, based on the running object's positional data, received from the positional sensing system. The image formation means can provide a visual display with a correspondence to the actual position of the models on the playing field.

The improved arcade game can provide simulated objects, such as riders and horses, moving across a support surface, such as a simulated race track.

A display screen is mounted adjacent the race track. The individual simulated objects are moved across the support surface by a motor driven carrier member positioned underneath the support surface and connected to the simulated object by a force field through the support surface. An array or grid of embedded wires can monitor the position of the simulated objects on the support surface and provide positional signals when oscillator coils mounted on the simulated objects are activated.

An image forming system can generate simulated images, on the display screen, of the simulated objects in the same positional relationship they occupy on the support surface in response to the positional signals including an image parameter memory, a character image memory, a character image setting circuit for providing positions of the simulated images from the image parameters and character image memories and a background image generating circuit for providing a background image whereby the displayed images will change in correlation with the position of the simulated images on the support surface.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best to be understood by reference to the following description, taken in connection with the accompanying drawings.

DESCRIPTION OF THE PREFERRED

Figure 1:
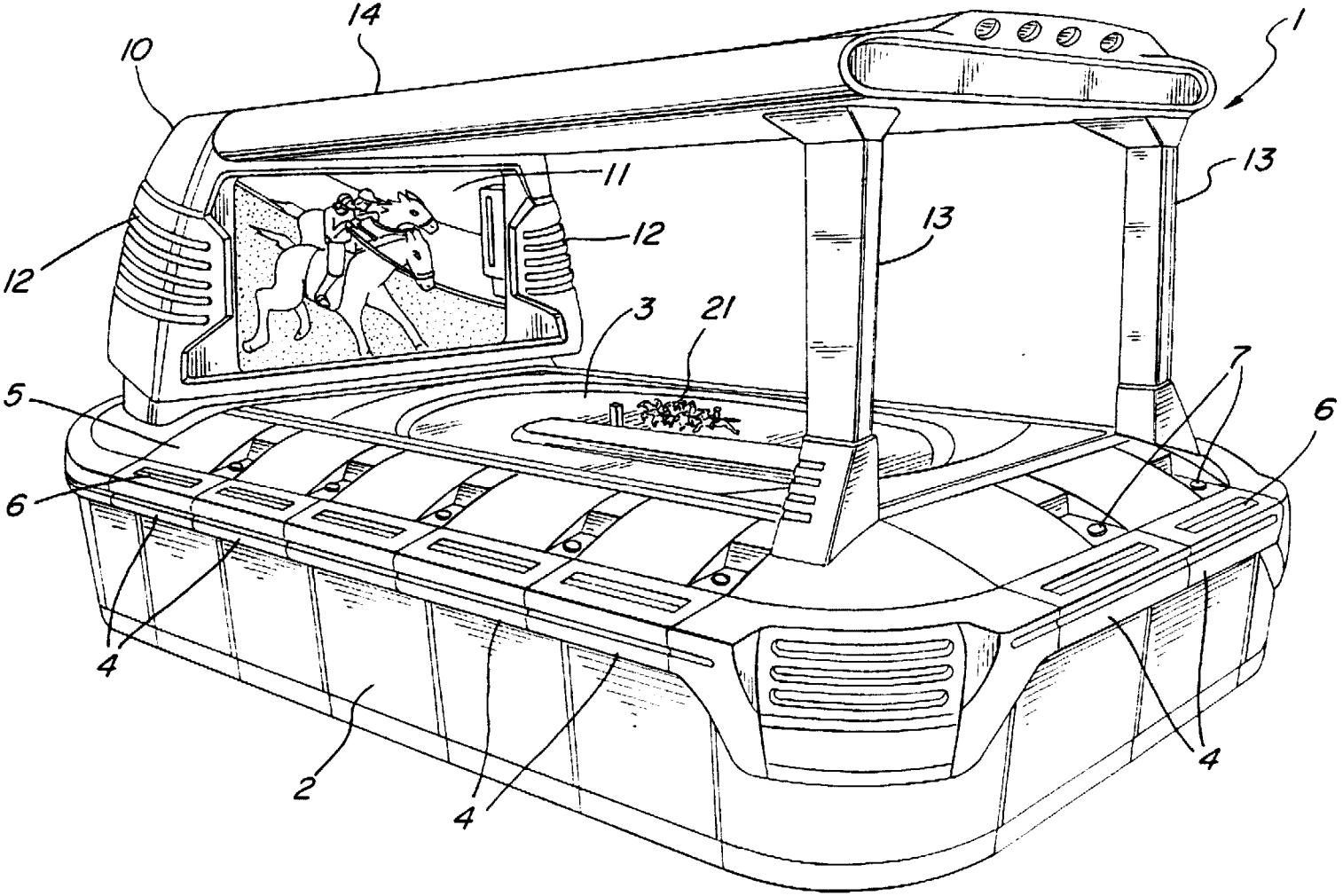
FIG. 1 is a perspective view of a visual display of an arcade game device.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a simulated visual display system for an arcade game.

The present applicant has submitted a Japanese application No. HE12-49862 to the Japanese Patent Office disclosing an arcade game wherein running objects are displayed on a television screen. In this application, a moving object photographing device, such as a video camera, can track and photograph moving objects, such as simulated race horses, according to various positions when the moving objects are sensed. A number of video cameras are situated in a variety of positions around a circular track and can photograph the horse models as they traverse the track. These photograph frames or images are then displayed on a monitor to give a sensation of viewing a live broadcast.

In such an arrangement, wherein the horse models and the rider models are tracked and photographed, the angle for each camera is fixed and accordingly the images displayed on the monitor are limited. Thus, the horses and riders, which can be visually perceived as only simulated models, are dissolved on a monitor in a manner in which they significantly differ from the movement of real life counterparts. As can be appreciated, since the imperfections of the model horses are displayed, the ability to create a real life simulation is missing and the potential excitement that can occur from a real life broadcast is missing.

The present invention has the ability of offering a video synchronizing device wherein it is possible to display on a monitor video images that are produced through a computer imaging system based on the measured positional data of the moving objects, such as model horses and riders. The present invention is disclosed in the preferred embodiment in the form of a race track, although it can be readily appreciated that a car race and other sporting activities can be utilized. Individual simulated models that participate in the race have their position determined throughout the running of the race and an image formation system can form and display on a monitor the composite computer images from a variety of angles, based on this positional data. Since this positional data corresponds to the actual positions of the simulated models on the track, it is therefore possible to display on the monitor images which are synchronized with the running objects. In addition, since computer images are utilized, it is possible to produce video images of characters that can closely resemble real horses and reminders, participating in actual simulated movements associated with running a race. There is no limitation to the actual configurations of the simulated models. Additionally, since the computer images can be displayed at a variety of angles, it is possible to produce video images throughout the development of an intensely competitive race that will actually resemble the running of horses at various positions on the track, including the ability to disclose a photo finish at the end of the race.

Referring to FIG. 1, a preferred embodiment of the present invention in the form of a horse racing arcade game as a competitive game device 1 is disclosed. A circular track 3 is positioned on the upper surface of an oblong mount or housing 2 to simulate a real horse race track. A number of operator satellite positions 4 are situated in front, rear, and side standing positions of the housing member 2. An individual monitor 5, operational panel 6, and coin slot 7 can be situated at each operator satellite. After an appropriate coin is inserted, the operational panel can be used by the operator to select, for example, a desired horse, in either a solo or multiple style. The horse's name, number, size, betting odds, etc., can be displayed on the monitor 5 and can prompt interface controls with the operator.

At one end of a housing member 2, a large display screen 11 is supported on a supporting wall 10 so that it occupies a standing position on a curve of the track 3 and faces the track 3 and the respective satellite operator positions. Speakers 12 can be installed on each side of the supporting wall 10 to provide audio sounds that can simulate the actual sounds of a race track. A pair of supporting posts or beams 13 are positioned at the other end to support a canopy or dome 14 which extends between the post 13 at one end of a curved track 3 and the supporting wall 10 at the other end. The dome 14 can further support a lighting system (not shown) which can provide appropriate lighting or illumination for the track 3 beneath it. In the illustrated embodiment, six simulated model racing horses 20, on which simulated riders 21 are seated, can be positioned to run on the track 3.

Figure 2:
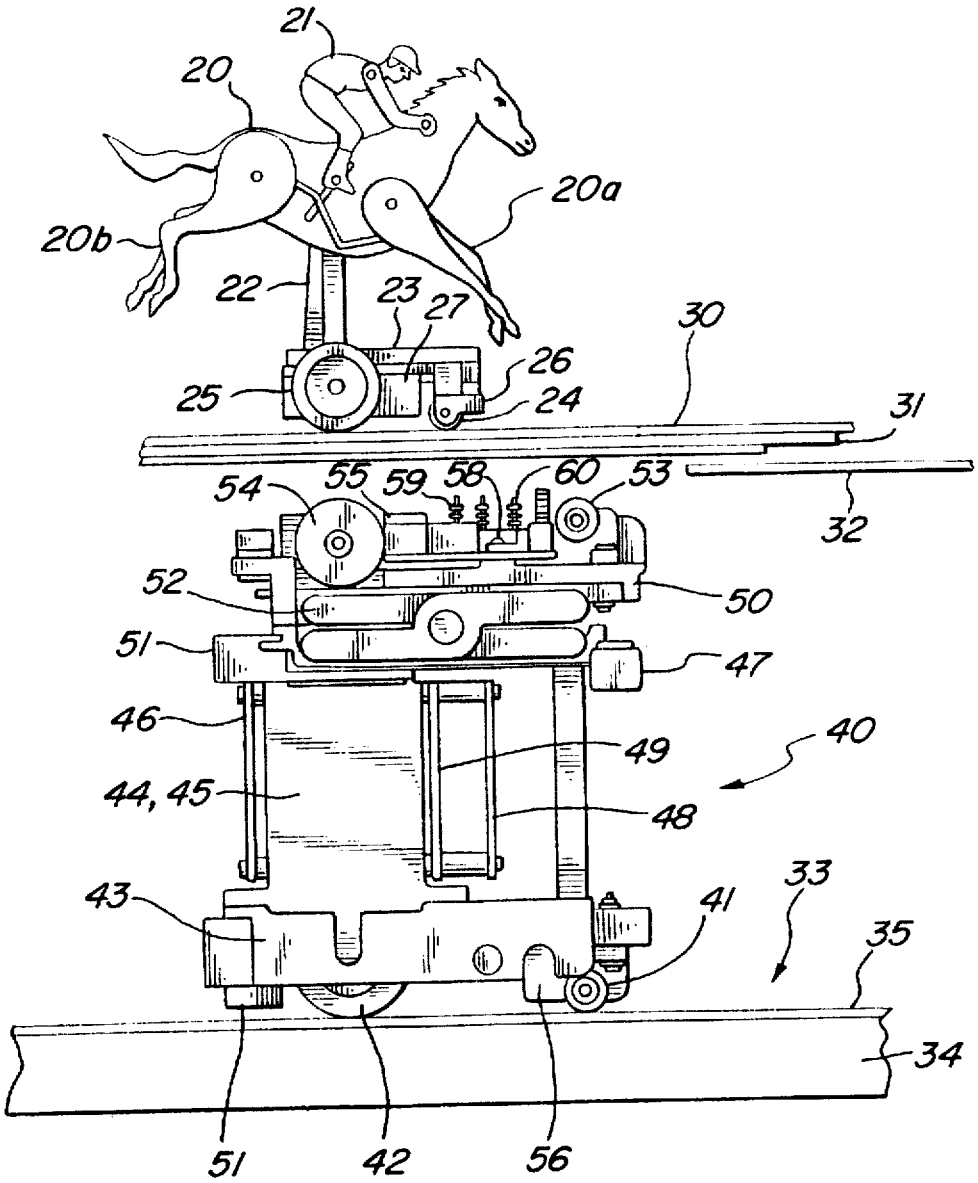
FIG. 2 is a partial elevated view of a model of the racing horse and is drive system relative to a track.

Referring to FIG. 2, an example of the model horses 20 and rider 21 are disclosed. These model horses 20 can imitate the movement of actual horses by a mechanical carried movement of their front legs 20a and rear legs 20b in a forward and backward movement according to the rotation of the rear wheels 25. Each of the individual model horses 20 are independently supported on trucks or frames 23 by support beams 22. The trucks 23 each have one front wheel 24 and a pair of rear wheels 25 on a respective left and right side of the truck. The front wheel 24 has a vertical supporting axis and is supported to allow a smooth variation of its movement direction from a cantilevered support member 26 which is supported to be freely rotated on the truck 23. As can be seen from FIG. 2, the truck 23 is designed to move on a support surface 30 that can resemble an actual race track. This support surface can consist of an aluminum sheet with an electrostatically flocked surface to form a top layer. A magnet 27 is fastened so the bottom of each of the trucks 23 at a slight distance offset from the surface of the track 3 and positioned between the left and right rear wheels 25.

The track 3 has a layered structure which includes the upper support surface 30 with an underlying acrylic reinforcing sheet 31 to form a middle layer and a power supply sheet 32 to form the bottom layer. This view is shown schematically in FIG. 2 and actually forms a laminate structure over the entire track. A hollow space exists below the power supply sheet 32 and separate running lanes 33 can be situated on the bottom of the empty space to face the track 3. The running lanes *or carrier-running surface* 33 actually consist of an acrylic sheet or material 35 stretched over a thick positional sensing plate 34 to be described subsequently. Mounted on the sensing plate 34 are a corresponding carrier 40 for each of the afore-mentioned horses 20. Each of the carriers 40 consists of a right motor 44 and a left motor 45 that can drive the left and right rear wheels 42 independently. These motors are held in place by a motor drive substrate 46 on one side and an oscillator substrate 48 and CPU substrate 49 can be mounted on the other side. A base 43 supports the front wheel 41 and the rear wheels 42. Mounted above the motors 44 and 45 are a pair of plate members 50 and 51, one upper and one lower, with a linking mechanism or member 52 positioned therebetween. The upper plate member 50 can be pushed upward by the linking member 52. On top of the plate member 50 is situated a front roller 53 and rear rollers 54 which are mounted to be easily movable in a horizontal direction. A collector unit 58 is positioned in the center and a magnet 55 is positioned between the left and right rear rollers 54.

A number of collector rings or brushes 59 are situated on the collector unit 58 to protrude upward. The afore-mentioned members situated atop of the plate member 50 are pushed upward through the linking member 52 in a scissor-like movement. As a result, the rollers 53 and 54 are thereby brought into contact with a power supply sheet 32 above, which forms the bottom layer of the track 3. The carrier 40 is designed to move smoothly between the track 3 and the running lane 33. In addition, the carrier 40 is designed so that the relative positions of the collector unit 58 and the power sheet 32 are maintained in the described positional relationship in order to provide power to the carrier 40. As a result, the tips of the collector rings 59, which protrude upward from a collector unit 58, maintain contact with the power supply sheet 32 via the spring 60, thereby making it possible for the power supply to be received from the power supply sheet 32 with a suitable pressing force. A truck 23, supporting the model horse and rider 21, is correspondingly positioned above a carrier 40, with the carrier 40 comprising the drive mechanism below the track 3. The magnet 55 on the carrier 40 will correspond to the magnet 27 on the model horse 20 and the magnetic attractive force between the respective magnets will cause the model horse 20 to follow the movement of its corresponding carrier 40. The carrier 40 not only receives power via the power supply sheet 32 and the collector unit 58, but in addition, it receives control signals from a light receiver 47 and from these control signals, information can be decoded to drive and control the right motor 44 and the left motor 45, so that the carrier 40 can be subjectively controlled.

As can be further seen in FIG. 2, a pair of oscillator coils 56 and 57 are fastened to the bottom of the base 43 of the carrier 40. These oscillator coils can be relatively excited to enable a determination of the position of a specific carrier 40 on the positional sensing sheet 34. The use of two separate oscillator coils 56 and 57 on each carrier unit 40 enables a determination of both position and the individual direction of each carrier unit, e.g., moving to the left or right relative to a principal direction along the track 3. The determined position of the carrier 40 is also used to enable the formation of images in the video system 80 which will be described subsequently. A microcomputer can be programmed to determine how the race will proceed and to execute the in control functions for the entire system. It can provide individual carrier control signals to each of the respective carriers. These control signals can be transmitted in a wireless manner, for example, through ultraviolet light or infrared light, to a light receiver 47 on each of the carriers 40. The carrier can then decode its own control signals to appropriately drive the right rotor 44 and the left motor 45.

Figure 3:
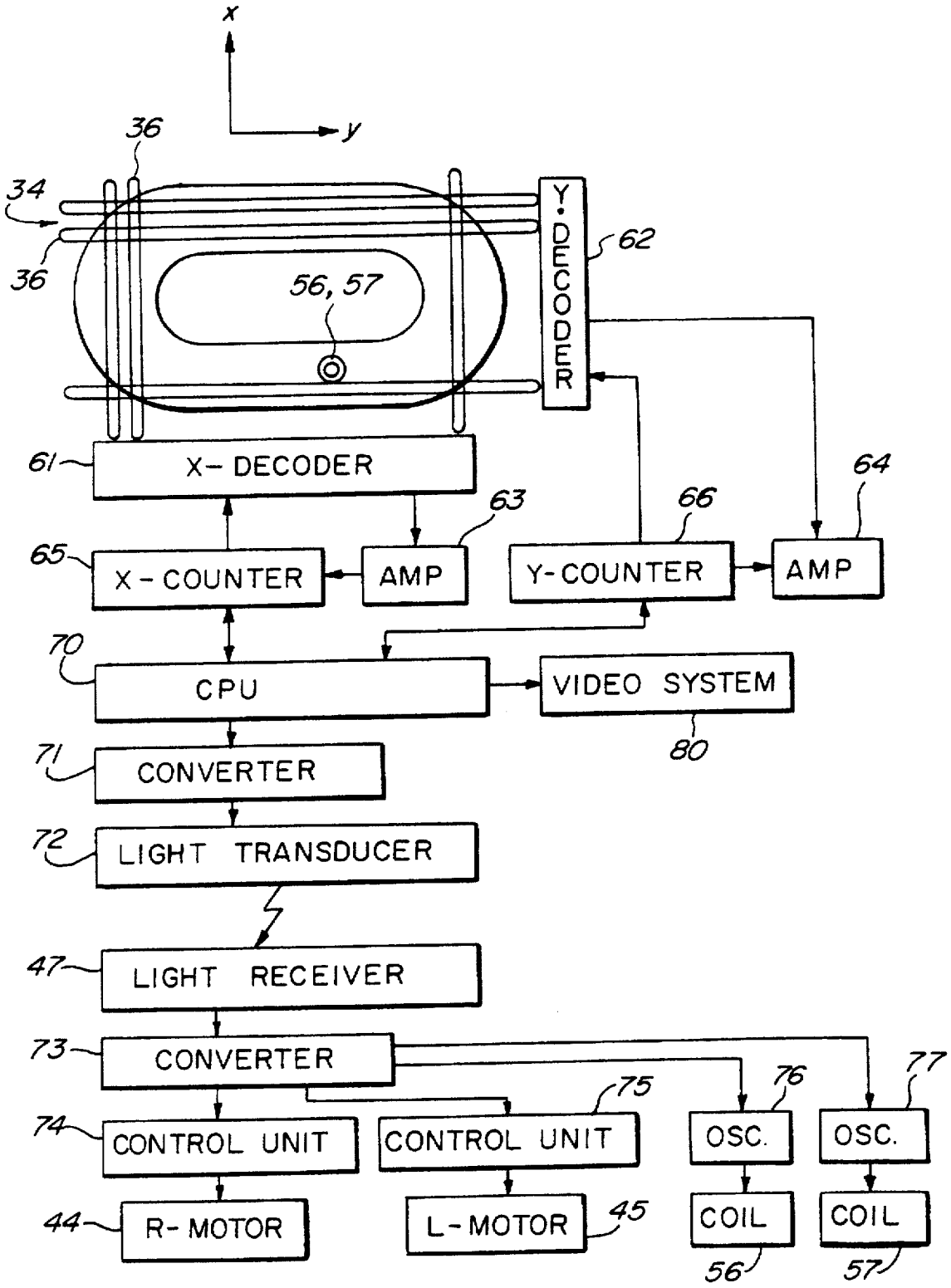
FIG. 3 is a schematic block diagram disclosing the control system relative to a positional sensing plate.

The manner in which the carrier 40 interacts with a positional sensing sheet can be explained with reference to FIG. 3. FIG. 3 is a schematic figure which illustrates the positional sensing plate 34 and its relationship to a schematic block diagram of the control system of the main race horse game device 1. A series of wires 36 are placed on the positional sensing plate 34 in both the lengthwise and widthwise directions. As shown by the arrows in FIG. 3, in X-axis direction and a Y-axis direction are arbitrarily set forth and a number of wires aligned in the Y-axis direction are arrayed to cross over the wires aligned in the X-axis direction to provide a grid array. These wires can be appropriately insulated. The wires aligned in the Y-axis direction are connected to an X-decoder 61 and the wires aligned in the X-axis direction are connected to a Y-decoder 62. Any signals sensed by these two coordinate axis decoders 61 and 62 can be appropriately amplified by amplifiers 63 and 64, and then their output signals can be input to an X-coordinate counter 65 and a Y-coordinate counter 66, respectively.

In operation, the X-coordinate counter 65 sequentially short-circuits the wires which are arrayed in the X-direction via the X-decoder 61 according to a specific predetermined count value. As the X-coordinated counter 65 senses the aforementioned electromagnetic force produced by the coils 56 and 57 on a specific carrier 40 its count value is output to a microcomputer operator 70 when it short-circuits a wire through which an induction current, generated by the coils, will flow. In the same manner, the Y-coordinated counter 66 also outputs its count value to the computer operator 70 when it reaches a wire through which an induction current flows, i.e. establishing the location of an individual carrier 40. As can be appreciated, the individual carriers can be programmed to activate their oscillators to produce positional signals in a coordinated manner so that it is possible to determine which carrier 40 is located at a particular position across the track 3. Additionally, the computer operator circuit 70 can further determine the drive controls to the right motor 44 and the left motor 45 for each carrier based on the specific race performance to be achieved and on the carrier position 40, as determined from positional data attained from the X-coordinate counter 65 and the Y-coordinate counter 66. The obtained control signals and drive oscillating control signals for the front coil 56 and the rear coil 57 can be output to an instructional parallel serial converter 71, converted to serial signals, and then emitted as ultraviolet light signals by a light transducer or transmitting unit 72.

The ultraviolet light control signals are received by the light receiver 47 for a specific carrier 40, and then they can be converted back to parallel signals by a serial-parallel instructional converter 73. The resulting motor drive control signals are then input to a right motor control unit 74 and a left motor control unit 75, thereby controlling the motor driving operations for moving the carrier 40. In addition, the oscillating control signals can be input to a front oscillator circuit 76 and a rear oscillator circuit 77, thereby oscillating the front coil 56 and rear coil 57 to produce an electromagnetic force to generate a current in the grid array wires of the positional sensing sheet 34. As can be appreciated, this control procedure can be sequentially utilized to address each of the individual carrier with appropriate control signals to effectuate the positioning and movement of the individual carriers as the race progresses.

Besides driving the individual model horses 20, the X- and Y-coordinates for each of the carriers 40 are output from the computer current to a video system 80 where image processing can be carried out based on these X- and Y-coordinates.

Figure 4:
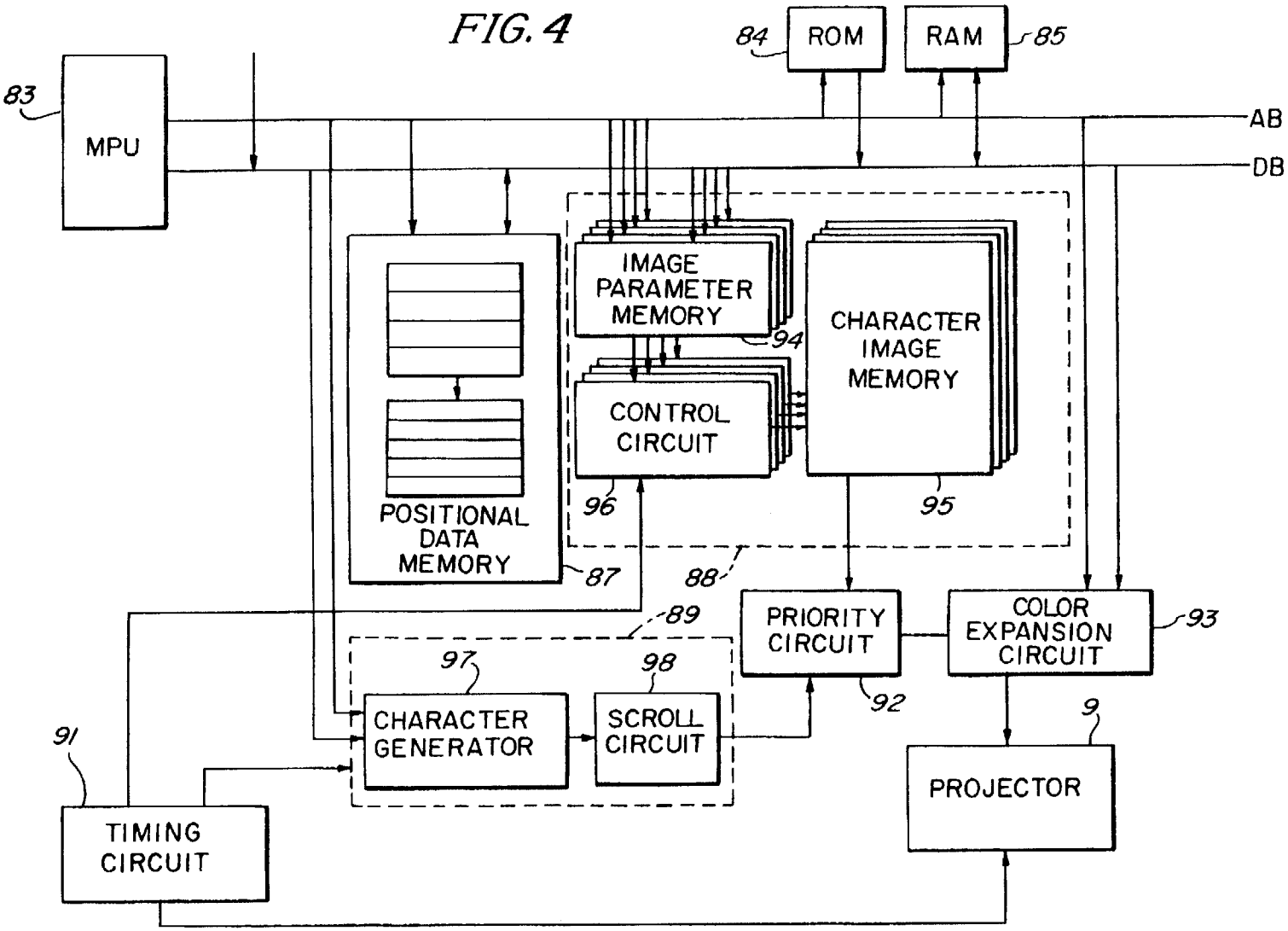
FIG. 4 is a schematic block diagram of the video display system.

Referring to FIG. 4, a schematic block diagram is provide which illustrates the structural operation of the video system 80. A microprocessor, MPU, system 83 can process the input data to carry out an image processing function in correlation with a RAM 85 and a control program stored in the ROM 84. The video system 80 comprises the following basic components, a positional data memory 87, which stores the positional data on each of the individual carriers 40, a character image setting circuit 88, which is capable of forming character images for each of the respective horses and riders; a background image generating circuit 89, which generates background images; a timing circuit 91, which forms the XY addresses corresponding to the vertical-horizontal synchronous signals; a priority circuit 92, which can selectively output the images of the aforementioned character image setting circuit 88 and the background generating circuit 89 according to predetermined priorities; a color expansion circuit 93, which can convert the colors of the image data output from the aforementioned priority circuit 92 into a wider or more expanded variety of colors and a projector 9, which can project the images onto a screen 11.

The character image setting circuit 88 further comprises an image data parameter memory 94, which can memorize and store the image data parameters, such as the positional information on the display screen 11, the size of the character, the colors of the character, the direction of the character, etc. These image data parameters can be set according to a game program and also based on a positional data from the aforementioned carriers 40. Additionally, the character image setting circuit 88 further includes a character image memory 95, which consists of a ROM which serves as a parameter memory for the various image data and a control circuit 96, which compares the aforementioned image data parameters to the X- and Y-addresses corresponding to the vertical-horizontal synchronous signals, sets the display position on the screen and outputs the corresponding image data from the character image 95. In the preferred embodiment, the character image setting circuit 88 can handle the production of character images for the video images of the race horses and the riders, based on a program algorithm that can generate particular images of the model horses 20 taking into consideration the present and past positions of the respective model horses 20 during the development of the race. The character image memory 95 stores image data, each consisting of between 100 and several hundred counter terms, depending on the particular demands of images for the particular arcade game system. The background image generating circuit 89 is capable of generating an appropriate background image, from a program algorithm, and comprises a character generator 97, which can output an 8×8 bit planar image element and a scroll circuit 98, which is capable of operating upon this array bit to expand these image elements. Character generator circuits are known in the computer animation field and do not per se constitute the present invention.

Figure 6A:
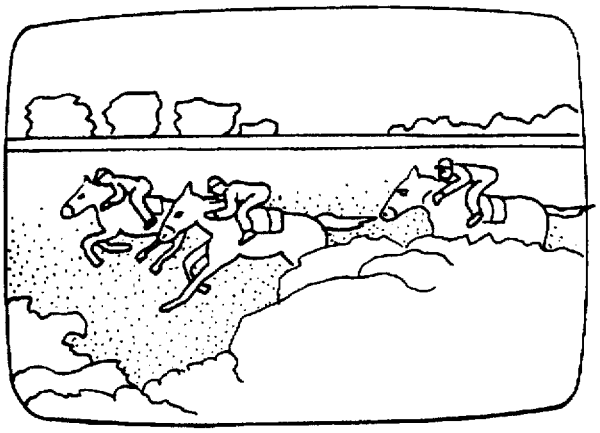
FIG. 6c, FIG. 6b, and FIG. 6c are illustrative views of the computer generated image that can be projected on the monitor.
Figure 6B:
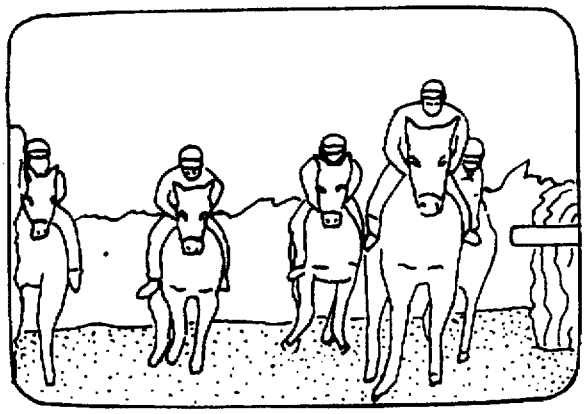
Figure 6C:
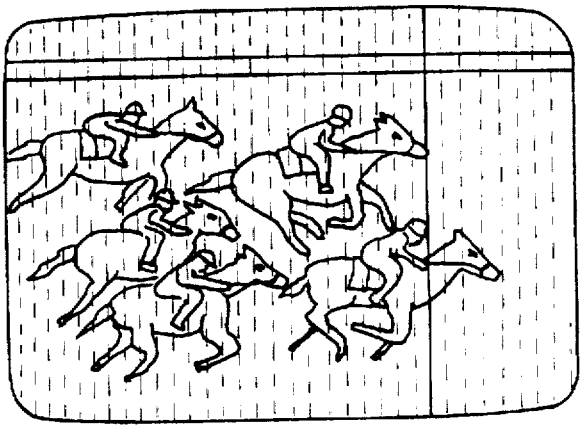

The character image setting circuit 88 and the background image generating circuit 89 are capable of forming images which will chance as the model horses 20 move, based on the positional data from each of the individual carriers 40. These circuits will continuously form images of the moving model horses 20 from a variety of different angles. Each of these circuits is connected to the MPU 83 through an address bus AB, and a data bus DB. The data transmission is accordingly carried out under instructions from the addresses placed on the address bus. Since these images are computed from a computer, they can be very realistic and not limited to the modeling configuration of the individual model horses 20. The images can be projected on the screen 1, as shown in FIGS. 6a through 6c. In this control system, the positional sensing circuit, the movement control circuit, and the video system can all function independently of each other, although obviously they are interrelated to coordinate their outputs to simulate a real racing race horse environment.

Figure 5:
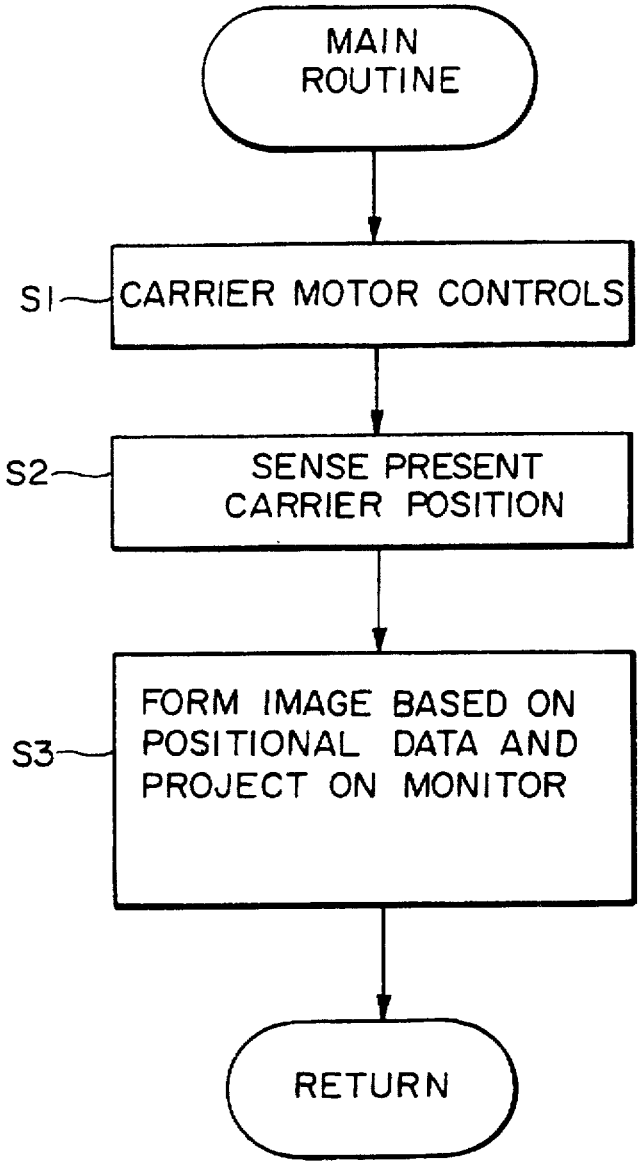
FIG. 5 is a schematic block diagram of the routine of the control system of the present invention.

Referring to FIG. 5, a short schematic program routine of the computer circuit 70 is disclosed. The main routine of the computer circuit 70 controls the right motor 44 and the left motor 45 for each of the carriers 40 to thereby enable them to be moved to a desired position in step 1. The current position of the carrier 40 is sensed, as shown in step 2, an image is formed based on the positional data sensed in step 2, and this video image is displayed on a screen 11, as shown in step 3. These aforementioned steps 1, 2, and 3 are carried out repeatedly in real time at a rate of 30–60 times per minute.

As described above, the model horses 20 will move across the track 3 with their individual motors 44 and 45 being drive-controlled, and a given type of race will accordingly develop. The video system 80 can form computer images of both background of the track and the individual horses that will correspond to the positional data of the individual model horses 20 on the track. These computer images are combined to be projected on the screen 11 to provide a video image, which will be positioned in correlation with the development of the actual race on the track 3. It is possible to form various video images of the computer images, which can be very similar to camera shots that could be taken from a variety of angles during a race that is in progress on the track 3. Thus, it is possible to display the race on the track 3 as if it were a live broadcast. In addition, the video images projected on the screen 11 will be images formed by a computer and the horse and rider characters and the background can be controlled to provide very realistic video images. The images can be taken from a variety of angles, to provide an intense realistic display of the action of the race. As can be appreciated, it is possible to form any desired type of image, since they are being derived from a computer and thus subjective game features can be included. As shown in FIG. 6c, it is even possible to display an image of a photographic flash.

Even if there exists a difference between an actual position and the position to which the model horse 20 is to be moved based on the control signals, it is possible at all times to project images, which are synchronous with the present position of the model horses 20 on the race track. This is due to the fact that computer images are formed directly based on the positional data sensed from the carriers 40.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An improved [arcade] game *device* having simulated objects moving across a support surface comprising:

means for moving the individual simulated objects across the support surface;

a display screen;

means for monitoring the position of the simulated objects on the support surface and providing positional signals; and image formation means for generating simulated images on the display screen of the simulated objects in the same positional relationship they occupy on the support surface in response to the positional signals, including an image parameter memory and a character image memory.

2. The [arcade] game *device* of claim 1 wherein the means for monitoring includes an array of wires and oscillator coils on the means for moving the simulated objects for inducing a current in the array of wires indicative of the position of the object.

3. The [arcade] game *device* of claim 1 wherein the means for moving includes a carrier member mounted for self-propulsion beneath the support surface.

4. The [arcade] game *device* of claim 3 further including means for wireless communications between the image formation means and the carrier member.

5. The [arcade] game *device* of claim 1 wherein the image formation means includes a character image setting circuit for providing positions of the simulated images, a background image generating circuit for providing a background image, and a priority circuit for selectively outputting images of the simulated images and background images whereby the displayed images will change in correlation with the position of the simulated objects on the support surface.

6. An improved [arcade] game *device* having simulated objects moving across a support surface comprising:

a display screen;

means for moving the individual simulated objects [across] *on* the support surface, including a motor driven carrier member positioned underneath the support surface and connected to a simulated object by a force field through the support surface;

means for monitoring the position of the simulated objects on the support surface and providing positional signals, and image formation means for generating simulated images on the display screen of the simulated objects in the same positional relationship they occupy on the support surface in response to the positional signals, including an image parameter memory, a character image memory, a character image setting circuit for providing positions of the simulated images from the image parameters and character image memories and a background image generating circuit for providing a background image whereby the displayed images will change in correlation with the position of the simulated [images] *objects* on the support surface.

7. The [arcade] game *device* of claim 6 wherein the simulated objects are riders and racing horses.

8. The [arcade] game *device* of claim 6 wherein the means for monitoring includes oscillator coils on the carrier member.

9. The [arcade] game *device* of claim 6 further including wireless means for activating the oscillator coils and motors on the carrier member.

10. An improved [arcade] game *device* having simulated physical objects moving across a support surface and simultaneously display computer generated video displays of the simulated objects, comprising:

a support surface simulating an environment [of the arcade game] *for the simulated objects*;

a plurality of simulated objects to provide individual players of the [arcade] game;

a display screen mounted for enabling a viewer to watch the play action of the simulated objects on the support surface and the display screen;

means for providing a play action of the [arcade] game;

means for moving the individual simulated objects across the support surface, including a motor driven carrier member positioned underneath the support surface and connected to a simulated object by a force field through the support surface;

means for monitoring the position of the simulated objects on the support surface and providing positional signals, and image formation means for generating simulated images on the display screen of the simulated objects in the same positional relationship they occupy on the support surface in response to the positional signals, including an image parameter memory, a character image memory, a character image setting circuit for providing positions of the simulated images from the image parameters and character image memories and a background image generating circuit for providing a background image whereby the displayed images will change in correlation with the position of the simulated [images] *objects* on the support surface.

11. An improved [arcade] game *device* having simulated objects moving across a support surface comprising:

means for moving the individual simulated objects across the support surface;

a display screen;

means for monitoring the position of the simulated objects on the support surface and providing positional signals, including an array of wires and oscillator coils on the means for moving the simulated objects for inducing a current in the array of wires indicative of the position of the object; and image formation means for generating simulated images on the display screen of the simulated objects in the same positional relationship they occupy on the support surface in response to the positional signals.

12. The [arcade] game *device* of claim 11 wherein the image formation means includes an image parameter memory and a character image memory.

13. The [arcade] game *device* of claim 11 wherein the means for moving includes a carrier member mounted for self-propulsion beneath the support surface.

14. The [arcade] game *device* of claim 13 further including means for wireless communications between the image formation means and the carrier member.

15. The [arcade] game *device* of claim 11 wherein the image formation means includes a character image setting circuit for providing positions of the simulated images, a background image generating circuit for providing a background image, and a priority circuit for selectively outputting images of the simulated images and background images whereby the displayed images will change in correlation with the position of the simulated objects on the support surface.

16. An improved [arcade] game *device* having simulated objects moving across a support surface comprising:

means for moving the individual simulated objects across the support surface, including a carrier member mounted for self-propulsion beneath the support surface;

a display screen;

means for monitoring the position of the simulated objects on the support surface and providing positional signals; and image formation means for generating simulated images on the display screen of the simulated objects in the same positional relationship they occupy on the support surface in response to the positional signals.

17. The [arcade] game *device* of claim 16 wherein the image formation means includes an image parameter memory and a character image memory.

18. The [arcade] game *device* of claim 16 further including means for wireless communications between the image formation means and the carrier member.

19. The [arcade] game *device* of claim 16 wherein the image formation means includes a character image setting circuit for providing positions of the simulated images, a background image generating circuit for providing a background image, and a priority circuit for selectively outputting images of the simulated images and background images whereby the displayed images will change in correlation with the position of the simulated objects on the support surface.

20. An improved [arcade] game *device* having simulated objects moving across a support surface comprising:

means for moving the individual simulated objects [across] *on* the support surface;

a display screen;

means for monitoring the position of the simulated objects on the support surface and providing positional signals; and image formation means for generating simulated images on the display screen of the simulated objects in the same positional relationship they occupy on the support surface in response to the positional signals, including a character image setting circuit for providing positions of the simulated images, a background image generating circuit for providing a background image, and a priority circuit for selectively outputting images of the simulated images and background images whereby the displayed images will change in correlation with the position of the simulated objects on the support surface.

21. The [arcade] game *device* of claim 20 wherein the means for monitoring includes an array of wires and oscillator coils on the means for moving the simulated objects for inducing a current in the array of wires indicative of the position of the object.

22. The [arcade] game *device* of claim 20 wherein the image formation means includes an image parameter memory and a character image memory.

23. The [arcade] game *device* of claim 20 wherein the means for moving includes a carrier member mounted for self-propulsion beneath the support surface.

24. The [arcade] game *device* of claim 23 further including means for wireless communications between the image formation means and the carrier member.

25. An improved arcade game having [sa] *a* simulated three-dimensional object moving across a support surface comprising:

means for moving the simulated object across the support surface;

a display screen positioned adjacent the support surface to enable an observer to view the three-dimensional object at one location and the display screen at a different location;

means for monitoring the position of the simulated three-dimensional object on the support surface and providing a positional signal; and image formation means for generating a simulated image on the display screen representative of the three-dimensional simulated object in the same positional relationship it occupies on the support surface in response to the positional signal.

26. The arcade game of claim 25 wherein the means for monitoring includes an array of wires and oscillator coils on the means for moving the simulated object for inducing a current in the array of wires indicative of the position of the object.

27. The arcade game of claim 25 wherein the image formation means includes an image parameter memory and a character image memory.

28. The arcade game of claim 25 wherein the means for moving includes a carrier member mounted for self-propulsion beneath the support surface.

29. The arcade game of claim 28 further including means for wireless communications between the image formation means and the carrier member.

30. The arcade game of claim 25 wherein the image formation means includes a character image setting circuit for providing positions of the simulated images, a background image generating circuit for providing a background image, and a priority circuit for selectively outputting an image of the simulated image and background image whereby the displayed image will change in correlation with the position of the simulated object on the support surface.

*31. A game device comprising:*

*an upper support surface simulating a racing track;*

*a plurality of model objects disposed to be individually movable on said upper support surface;*

*running lanes disposed underneath and substantially in parallel to said upper support surface with a space therebetween;*

*a plurality of carrier members individually movably disposed on said running lanes in said space correspondingly to said model objects, each of said carrier members being spacedly engaged with the corresponding model object by a magnetic force across said upper support surface and having self-propulsion means so that the model object moves following the movement of the carrier member;*

*means for sensing positions of the individual carrier members and outputting positional signals;*

*image generating means for generating signals for displaying various computer-generated simulated images indicative of the model objects in response to said positional signals; and*

*a display means for displaying various video images of racing scenes in response to the signals from said image generating means.*

* * * * *